US012799783B2

(12) United States Patent
Calamaco et al.

(10) Patent No.: US 12,799,783 B2
(45) Date of Patent: Nov. 17, 2026

(54) HOOD LATCH FOR VEHICLE

(71) Applicant: INTEVA PRODUCTS, LLC, Troy, MI (US)

(72) Inventors: Jesus Eli Calamaco, Ciudad Juarez (MX); Eduardo Estrada De Leon, Ciudad Juarez (MX); Adrian Sinai Perez, Ciudad Juarez (MX); Tania Jocelyn Soto, Ciudad Juarez (MX)

(73) Assignee: INTEVA PRODUCTS, LLC, Troy, MI (US)

( * ) Notice: Subject to any disclaimer, the term of this patent is extended or adjusted under 35 U.S.C. 154(b) by 0 days.

(21) Appl. No.: 19/059,895

(22) Filed: Feb. 21, 2025

(65) Prior Publication Data

US 2025/0270858 A1 Aug. 28, 2025

Related U.S. Application Data

(60) Provisional application No. 63/557,343, filed on Feb. 23, 2024.

(51) Int. Cl.
*E05B 83/24* (2014.01)
*E05B 81/20* (2014.01)

(52) U.S. Cl.
CPC ............ *E05B 83/243* (2013.01); *E05B 81/20* (2013.01)

(58) Field of Classification Search
CPC ........ E05B 83/16; E05B 83/24; E05B 83/243; E05B 83/247; E05B 81/20
See application file for complete search history.

(56) References Cited

U.S. PATENT DOCUMENTS 4,968,073 A * 11/1990 Kuhlman ................ E05B 81/22 292/216
11,060,327 B2 * 7/2021 Szente .................... E05B 83/24
2021/0301564 A1 * 9/2021 Sasaki ...................... E05B 83/24
2025/0034918 A1 * 1/2025 Distefano ............. E05B 83/243

FOREIGN PATENT DOCUMENTS

CN 110836056 A * 2/2020 ............. E05B 83/24

OTHER PUBLICATIONS

CNIPA First Office Action corresponding to CN Application No. 202520298681.8; Issue date, Dec. 17, 2025, 3 pages.

* cited by examiner

*Primary Examiner* — Alyson M Merlino
(74) *Attorney, Agent, or Firm* — CANTOR COLBURN LLP

(57) ABSTRACT

A pop-up system (26) for a latch mechanism (24) of a vehicle, including: a main lever (30) pivotally mounted to a plate (32) of the latch mechanism (24); a split lever (36) pivotally mounted to the plate (32); a main spring (28) for providing a biasing force to the main lever (30) via the split lever (36); a bell crank (38) pivotally mounted to the main lever (30), the bell crank (38) being operably coupled to the split lever (36) at one end and a link (40) at another end, the link (40) pivotally mounted to a cinch lever (42), the cinch lever (42) being pivotally mounted to the plate (32); and a pawl (46) pivotally mounted to the plate (32), the pawl (46) being moveable between at least an engaged position wherein the pawl (46) maintains the split lever (36) in a first position wherein a biasing force of the main spring is prevented from being applied to the main lever (30) and a disengaged position wherein the biasing force of the main spring is applied to the main lever (30) in order rotate the main lever into an open position when the latch mechanism (24) is released.

16 Claims, 8 Drawing Sheets

HOOD LATCH FOR VEHICLE

CROSS REFERENCE TO RELATED APPLICATIONS

This application claims the benefit of U.S. Provisional Patent Application No. 63/557,343 filed on Feb. 23, 2024, the entire contents of which are incorporated herein by reference thereto.

BACKGROUND

Exemplary embodiments of the present disclosure pertain to the art of vehicle latches and more particularly, to a hood latch for a vehicle.

Vehicles can be configured to have a front storage compartment that is accessible through a hood that is capable of being manipulated between an open and closed position. In order to retain the hood in a latched or closed position, a latch is provided to maintain the hood in a latched or closed position. These front storage compartments may be referred to as a "Frunk" that has a latch or latch device for retaining the hood in the closed position. In some configurations, the latch or latch device is provided with a pop-up system that when actuated applies a spring biasing force to the hood in order to move it from the closed position to an open position. This spring biasing force is provided by a spring that must be compressed when the hood is being closed and/or latched. Accordingly, it is desirable to provide a latch or latch mechanism for a vehicle hood wherein the compression of the spring does not interfere with the latching process.

BRIEF DESCRIPTION

Disclosed is a pop-up system for a latch mechanism of a vehicle, including: a main lever pivotally mounted to a plate of the latch mechanism; a split lever pivotally mounted to the plate; a main spring for providing a biasing force to the main lever via the split lever; a bell crank pivotally mounted to the main lever, the bell crank being operably coupled to the split lever at one end and a link at another end, the link pivotally mounted to a cinch lever, the cinch lever being pivotally mounted to the plate; and a pawl pivotally mounted to the plate, the pawl being moveable between at least an engaged position wherein the pawl maintains the split lever in a first position wherein a biasing force of the main spring is prevented from being applied to the main lever and a disengaged position wherein the biasing force of the main spring is applied to the main lever in order rotate the main lever into an open position when the latch mechanism is released.

In addition to one or more of the features described above, or as an alternative to any of the foregoing embodiments, the split lever has a pin or protrusion that is configured contact a leg of the main spring.

In addition to one or more of the features described above, or as an alternative to any of the foregoing embodiments, the split lever has a tab portion configured to contact an end of the pawl when the pawl is in the engaged position.

In addition to one or more of the features described above, or as an alternative to any of the foregoing embodiments, a rotational force is applied to the main lever by an edge of the tab portion of the split lever contacting an edge portion of the main lever.

In addition to one or more of the features described above, or as an alternative to any of the foregoing embodiments, the bell crank has a tab portion configured to contact a tab portion of the split lever when the split lever is in the first position.

In addition to one or more of the features described above, or as an alternative to any of the foregoing embodiments, the main lever has a tab portion configured to contact the pawl and rotate the pawl into the disengaged position.

In addition to one or more of the features described above, or as an alternative to any of the foregoing embodiments, the latch mechanism further comprises: a claw rotatably mounted to the plate and the cinch lever is operably coupled to the claw.

In addition to one or more of the features described above, or as an alternative to any of the foregoing embodiments, the latch mechanism further comprises: a latch pawl rotatably mounted to the plate for movement between an engaged position and a disengaged position, the engaged position of the latch pawl retaining the claw in a closed position and the disengaged position of the latch pawl allowing the claw to rotate from the closed position to an open position.

In addition to one or more of the features described above, or as an alternative to any of the foregoing embodiments, the split lever has a pin or protrusion that is configured contact a leg of the main spring.

In addition to one or more of the features described above, or as an alternative to any of the foregoing embodiments, the split lever has a tab portion configured to contact an end of the pawl when the pawl is in the engaged position.

In addition to one or more of the features described above, or as an alternative to any of the foregoing embodiments, a rotational force is applied to the main lever by an edge of the tab portion of the split lever contacting an edge portion of the main lever.

In addition to one or more of the features described above, or as an alternative to any of the foregoing embodiments, the bell crank has a tab portion configured to contact a tab portion of the split lever when the split lever is in the first position.

In addition to one or more of the features described above, or as an alternative to any of the foregoing embodiments, the main lever has a tab portion configured to contact the pawl and rotate the pawl into the disengaged position.

In addition to one or more of the features described above, or as an alternative to any of the foregoing embodiments, the latch mechanism is configured to retain a vehicle hood in a closed position by engaging a striker of the vehicle hood.

In addition to one or more of the features described above, or as an alternative to any of the foregoing embodiments, the latch mechanism is configured to retain a vehicle hood in a closed position by engaging a striker of the vehicle hood.

Also disclosed is a method for disengaging a main spring from a main lever of a pop-up system for a latch mechanism of a vehicle, including: pivotally mounting the main lever to a plate of the latch mechanism; pivotally mounting a split lever to the plate; providing a biasing force by a main spring to the main lever via the split lever; pivotally mounting a bell crank to the main lever, the bell crank being operably coupled to the split lever at one end and a link at another end, the link pivotally mounted to a cinch lever, the cinch lever being pivotally mounted to the plate; and pivotally mounting a pawl to the plate, the pawl being moveable between at least an engaged position wherein the pawl maintains the split lever in a first position wherein a biasing force of the main spring is prevented from being applied to the main lever and a disengaged position wherein the biasing force of the main spring is applied to the main lever in order rotate the main lever into an open position when the latch mechanism is released.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
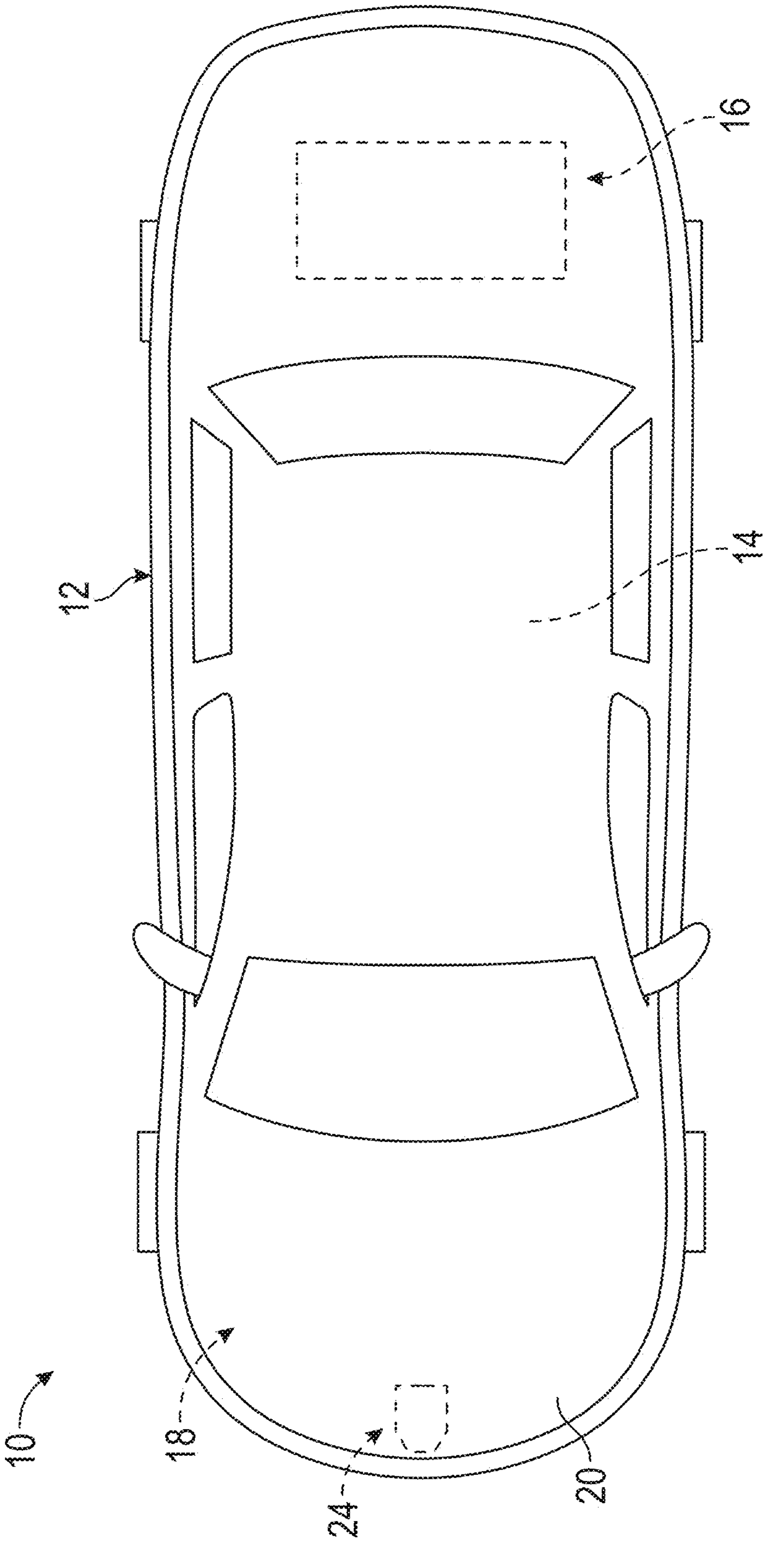
FIG. 1 is a top view of a vehicle having a hood latch in accordance with the present disclosure.

With initial reference to FIG. 1, a motor vehicle is indicated generally at 10. Motor vehicle 10 includes a body 12 that defines an occupant compartment 14. Body 12 supports a prime mover 16 which may take on a variety of forms including internal combustion engines, hybrid engines, and electric motors. Prime mover 16 may be mounted in a rear portion (not separately labeled) of body 12 or may be arranged as a mid-engine configuration. In an embodiment, body 12 includes a forward storage compartment 18 having a hood 20. As will be detailed herein, hood 20 includes a striker element that cooperates with a latch or latch mechanism 24 in order to retain the hood 20 in a closed or latched position and then subsequently release the hood from the closed or latched position so that it may be transitioned into an open position.

Referring now to FIGS. 1-4, the latch or latch mechanism 24 in accordance with the present disclosure is illustrated. The latch or latch mechanism 24 includes a pop-up system or mechanism 26. The pop-up system or mechanism 26 is configured to provide a pop-up force to the hood 20 when the latch or latch mechanism 24 is released. The pop-up force is provided by a main spring 28. In accordance with various embodiments of the present disclosure, the pop-up system or mechanism 26 is configured to remove the an opposing biasing force of the main spring 28 when the latch or latch mechanism 24 is an open position so that components of the pop-up up system or mechanism 26 and/or the latch or latch mechanism 24 can transition from an open position to a closed position during a cinching operation without having to overcome the biasing force of the main spring 28. In other words, the pop-up up system or mechanism 26 is configured to remove the biasing force of the main spring 28 first and prior to a portion of a cinching operation of the latch or latch mechanism 24 that transitions a claw of the latch or latch mechanism 24 into a closed position. Thereafter and when the cinching operation is complete and the latch or latch mechanism 24 closed (e.g., claw of the latch or latch mechanism 24 is in the closed position), the pop-up up system or mechanism 26 reintroduces the biasing force of the main spring 28 to the latch or latch mechanism 24 and/or the pop-up up system or mechanism 26 so that the biasing force of the main spring 28 can be used for popping open the hood 20 associated with the latch or latch mechanism 24 and/or the pop-up up system or mechanism 26.

As mentioned above, a hood latch device that includes a pop-up mechanism or system allows the hood to be lifted and partially opened. So that the pop-up mechanism or system can lift the weight of the hood, it is necessary to provide the system with a strong enough spring. This spring must be manipulated or compressed during the closing action of the hood so that the compressed spring can be used to pop-up the hood once again. If the closing of the hood is carried out automatically through actuators. The actuators would have to overcome the opposition of the biasing force of the pop up spring as it is being manipulated or compressed. Therefore, it is desirable to be able to remove the opposing force of the pop-up spring and leave an unincumbered free path for the hood or frunk in its closing action and in particular when the closing action is being provided by a motorized cinching operation.

In accordance with the present disclosure, the pop-up up system or mechanism 26 has a lever that is split into two components that allows removable of the influence of the pop-up spring by means of a closure mechanism on the latch, in order to remove the influence of the main spring when the hood is in closing action. Additionally, a retention mechanism is provided that includes a pawl component that keeps the spring disabled until the latch is closed. This retention mechanism is overridden or released when the latch mechanism reaches its fully closed position.

Figure 2:
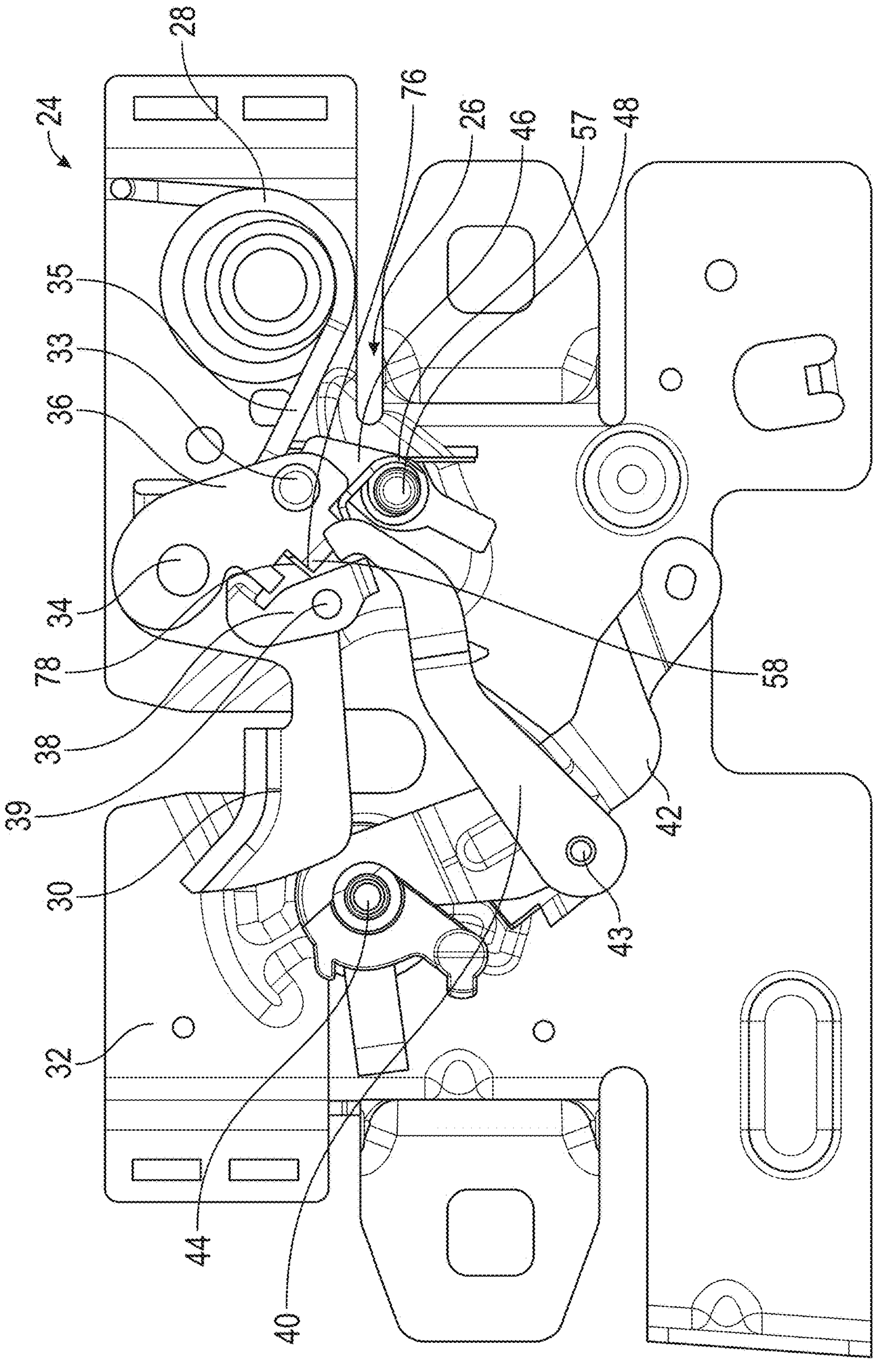
FIGS. 2-4 are views illustrating a pop-up system for use with a latch or latch mechanism of the present disclosure.
Figure 3:
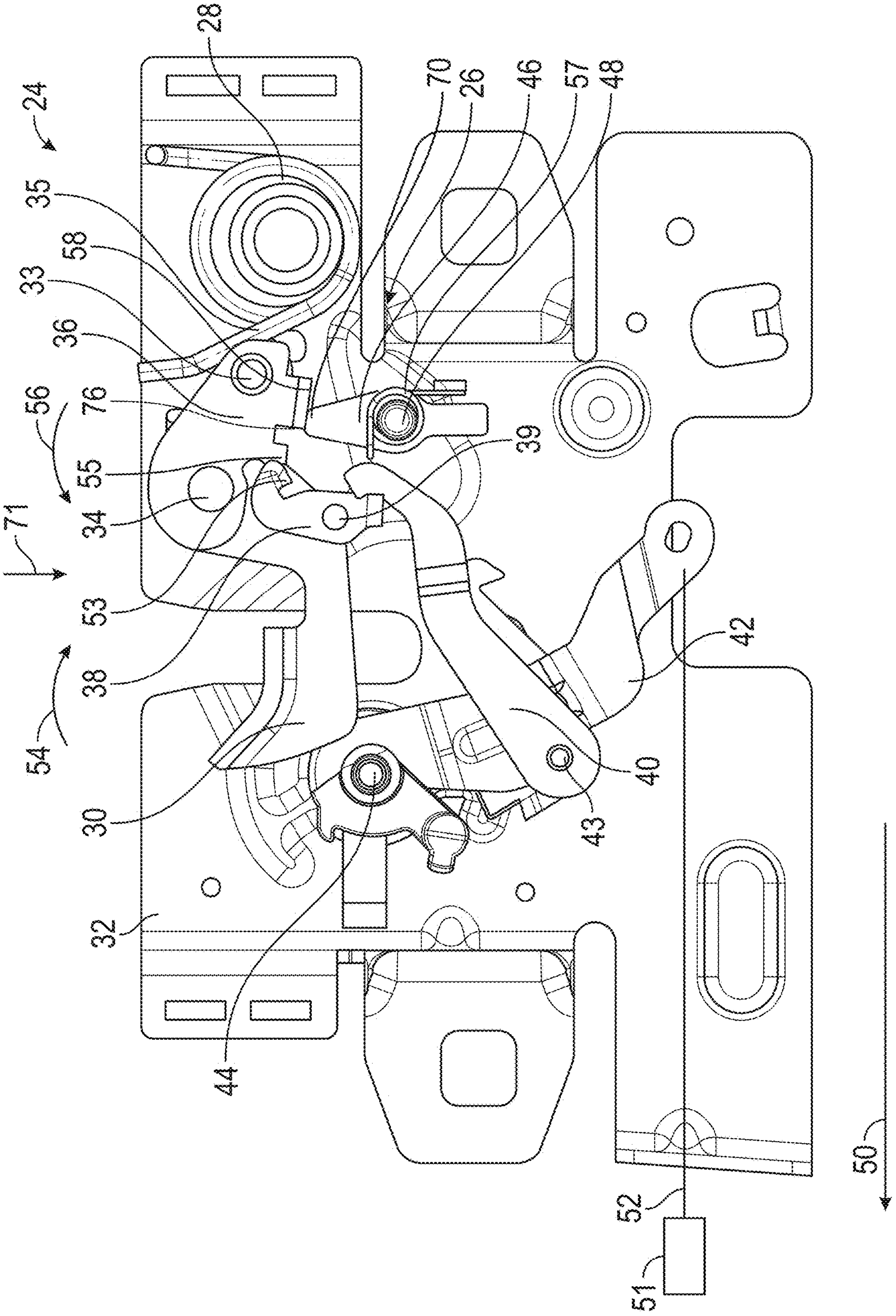
Figure 4:
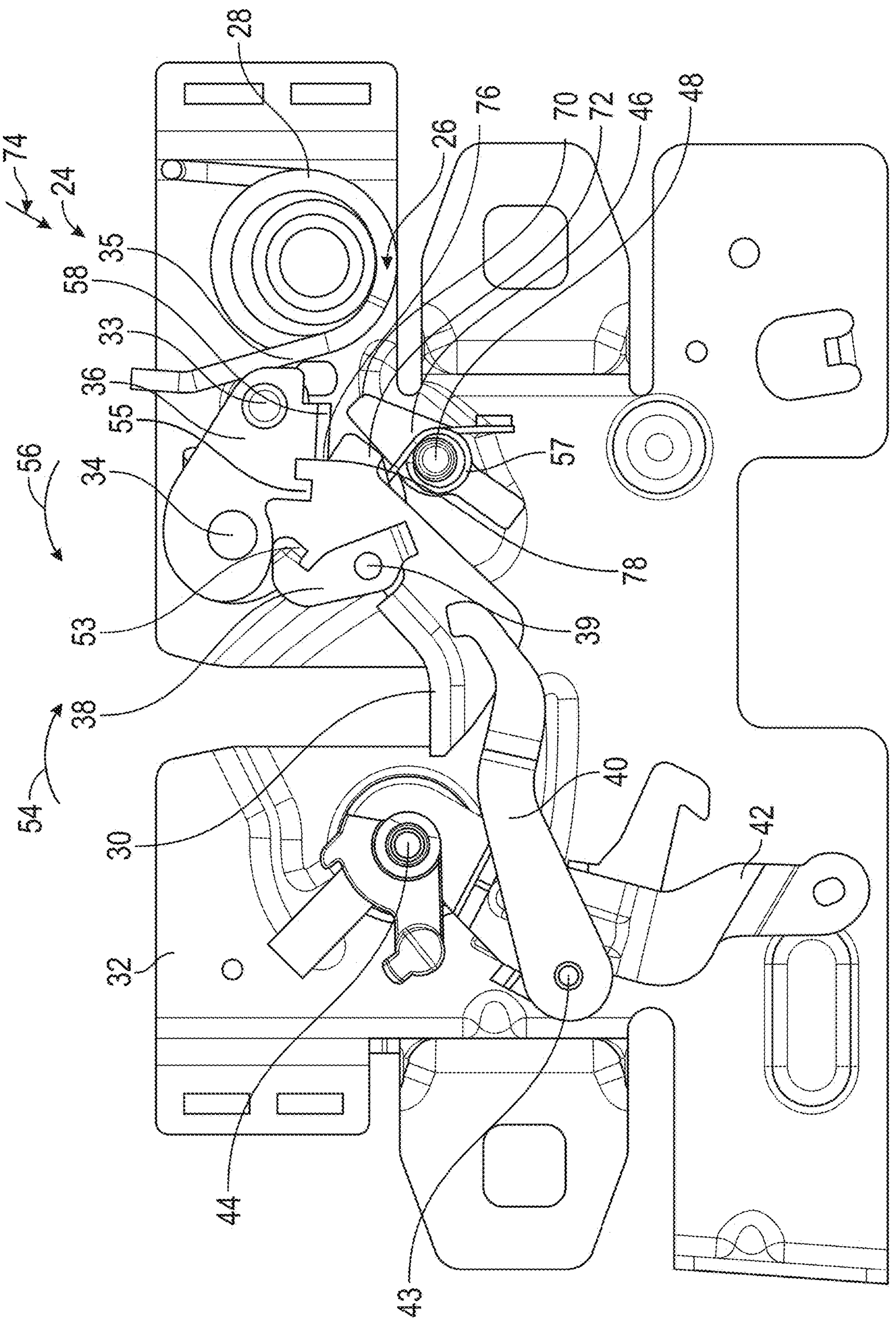

In FIG. 2, components of the pop-up up system or mechanism 26 of the latch or latch mechanism 24 in accordance with the present disclosure is illustrated. In FIGS. 2-4, other components (e.g., claw, pawl etc.) of the latch or latch mechanism 24 are not illustrated for convenience of illustrating the pop-up up system or mechanism 26. In FIG. 2, the pop-up up system or mechanism 26 of the latch or latch mechanism 24 is in an open position (e.g., hood opened).

The pop-up up system or mechanism 26 of the latch or latch mechanism 24 includes a main lever 30 pivotally mounted to a plate 32 of the latch or latch mechanism 24 via a pin or post 34. The main lever 30 is configured to provide a biasing or opening force to a striker of the hood 20 as it rotates from a closed position to an open position. In addition, the main lever 30 is capable of rotation between an open position and a closed position. The biasing or opening force is provided by main spring 28, which in one non-limiting embodiment may be a torsion spring. Also pivotally mounted to the pin 34 is a split lever 36. The split lever 36 has a pin or protrusion 33 that is configured contact a leg 35 of the main spring 28 as the split lever 36 rotates about pin 34. As such, the aforementioned lever that is split into two components may be referred to as the main lever 30 and the split lever 36.

A bell crank 38 is pivotally mounted to the main lever 30 via a pin or rivet 39. The bell crank 38 is operably coupled to the split lever 36 at one end and a link 40 at another end. The link 40 is also pivotally mounted to a cinch lever 42 pivotally mounted to the plate 32 by for example, a pin 44. The link 40 is pivotally secured to the cinch lever 42 by for example a pin or rivet 43. The pop-up system or mechanism 26 also includes a pawl 46 pivotally mounted to the plate 32 by for example, a pin 48. The pawl 46 is moveable between at least a first or an engaged position (FIG. 3) where the pawl 46 maintains the split lever 36 in a first or a spring disengaged position such that main spring 28 is not applying a biasing force to the main lever 30 and a second or a spring engaged position (See at least FIG. 4) wherein the biasing force of the main spring 28 is indeed applied to the main lever 30 in order to assist in popping up the hood of the vehicle when the latch or latch mechanism 24 is released.

In FIG. 3, the cinch lever 42 has been moved in the direction of arrow 50 through actuation of a cable 52 secured to the cinch lever 42. The movement of cable 52 in the direction of arrow 50 may be facilitated by a motor 51 (illustrated schematically) or manual actuation. This movement may be referred to as a first movement of the cinch lever 42 in the direction of arrow 50. This first movement of the cinch lever 42 in the direction of arrow 50 causes movement of the link 40 in the direction of arrow 54 which in turn rotates the bell crank 38 in the direction of arrow 54. This movement of the bell crank 38 in the direction of arrow 54 causes rotational movement of the split lever 36 in the direction of arrow 56, which in turn causes pin or protrusion 33 to engage leg 35 of the spring 28. This movement of the bell crank 38 in the direction of arrow 54 is facilitated by tab portion 53 of the bell crank 38 contacting a complimentary tab portion 55 of the split lever 36 when the bell crank 38 rotates in the direction of arrow 54 which causes rotation of the split lever 36 in the direction of arrow 56 due to the contact of portions 53 and 55.

As the split lever 36 is rotated in the direction of arrow 56 from the position illustrated in FIG. 2 to the position illustrated in FIG. 3, the pawl 46 is free to rotate generally in the direction of arrow 56 due to a biasing force applied to the pawl 46 by a spring 57 and a tab portion 58 of the split lever 36 is now engaged by an end 70 of the pawl 46 in order to maintain the split lever 36 in the first or spring disengaged position such that main spring 28 is not applying a biasing force to the main lever 30. As such, the biasing force of the main spring 28 is not being applied to the main lever 30 and further movement of the cinch lever 42 in the direction of arrow 50 from the position illustrated in FIG. 3 to that illustrated in FIG. 4 does not have to overcome the biasing force of main spring 28. Thus, less closing or cinching force is required. This movement of the cinch lever 42 in the direction of arrow 50 from the position illustrated in FIG. 3 to that illustrated in FIG. 4 may be referred to as a second movement of the cinch lever 42 in the direction of arrow 50.

In addition, the main lever 30 is still in the open position and is ready to be moved into the closed position without being engaged to the main spring 28. The movement of the main lever 30 from the open position illustrated in FIG. 3 into the closed position illustrated in FIG. 4 will be facilitated by gravity in the direction of arrow 71 as the main lever 30 is now free to rotate in the direction of arrow 56. In other words, when the biasing force of main spring 28 is removed from the main lever 30 (e.g., movement of the split lever 36 from the position in FIG. 2 to FIG. 3), the main lever 30 is free to rotate by gravity from the position in FIG. 3 to the position illustrated in FIG. 4. If for some reason, the main lever 30 is stuck and does not rotate in the direction of arrow 56 from the position illustrated in FIG. 3 to that illustrated in FIG. 4, the movement of the cinch lever 42 in the direction of arrow 50 from the position illustrated in FIG. 3 to that illustrated in FIG. 4 (e.g., the second movement of the cinch lever 42 in the direction of arrow 50) also causes a claw of the latch or latch mechanism 24 to transition from its open position to a closed or latched position which causes a striker of the hood 20 to be captured or retained by the claw of the latch or latch mechanism 24. As the striker of the hood 20 is captured or retained by the claw of the latch or latch mechanism 24 the striker also contacts the main lever 30 and rotates the main lever 30 in the direction of arrow 56 from the position illustrated in FIG. 3 to that illustrated in FIG. 4.

As such, further movement of the cinch lever 42 in the direction of arrow 50 from the position illustrated in FIG. 3 to that of FIG. 4 will cause the main lever 30 to rotate in the direction of arrow 56 into the closed position of the main lever 30 illustrated in FIG. 4. This movement may be due to gravity in the direction of arrow 71 and/or a striker contacting the main lever 30 as a claw of the latch or latch mechanism 24 is rotated into a closed position thereby capturing and retaining the striker and causing it to contact the main lever 30 as the claw is rotated into the closed position and the striker rotates the main lever 30 in the direction of arrow 56.

The rotation of the claw of the latch or latch mechanism 24 into the closed position may be facilitated by a cinching operation of the latch or latch mechanism 24. The cinching operation of the latch or latch mechanism 24 causes the claw of the latch or latch mechanism 24 to rotate into a primary or latched position as the cinch lever 42 is operably coupled to the claw of the latch or latch mechanism 24.

Referring now to FIG. 4, the main lever 30 has been moved to the closed position and this movement (e.g., main lever 30 from the open position to the closed position whether by gravity and/or movement of the striker into the claw into the closed position of the claw and the latch or latch mechanism 24) causes a tab portion 72 of the main lever 30 to contact the pawl 46 and rotate it in the direction of arrow 54 such that end 70 of the pawl 46 no longer contacts tab portion 58 of the split lever 36. As such, a spring biasing force of the main spring 28 in the direction of arrow 74 is applied to pin or protrusion 33 of the split lever 36 which in turn causes an edge 76 of tab portion 58 of the split lever 36 to provide a biasing force to an edge portion 78 of the main lever 30 which in turn provides a rotational force in the direction of arrow 54 to the main lever 30. As such, and as illustrated in at least FIG. 4, the main spring 28 is now providing a pop-up force to the main lever 30 in the direction of arrow 54, which will be applied to a striker of the hood 20 when the latch or latching mechanism 24 is released and the pop-up up system or mechanism 26 of the latch or latch mechanism 24 will be moved from the position illustrated in FIG. 4 (latch closed, pop-up up system or mechanism 26 ready to provide opening force) to the position illustrated in FIG. 2 (latch open, pop-up up system or mechanism 26 has provided opening force).

In other words, as the split lever 36 is rotated in the direction of arrow 54 from the position illustrated in FIG. 4, edge 76 of tab portion 58 of the split lever 36 contacts edge portion 78 of the main lever 30 in order to rotate the main lever 30 in the direction of arrow 54. The force for rotating the main lever 30 in the direction of arrow 54 is applied by spring 28.

Figure 5:
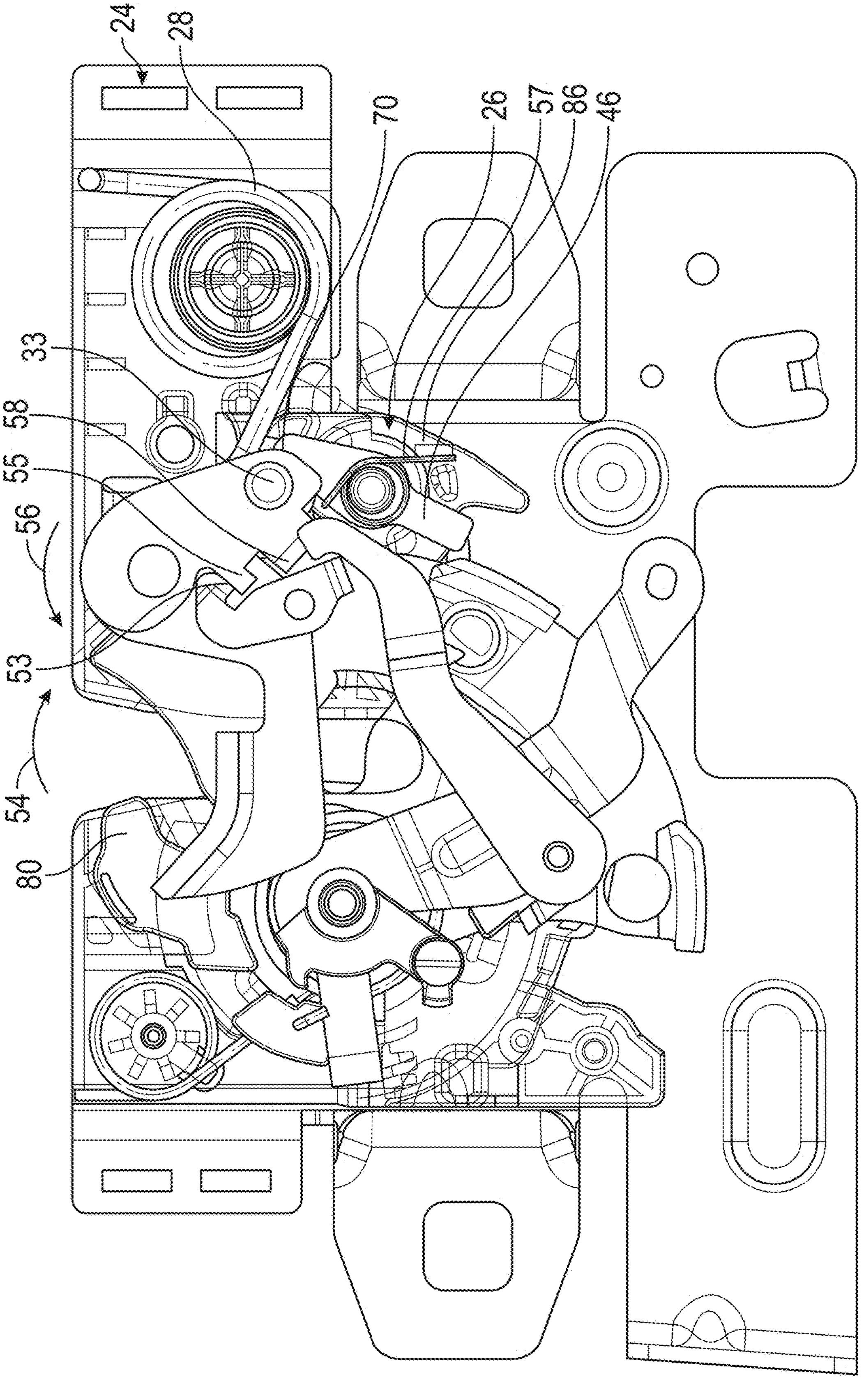
FIGS. 5-8 are views illustrating a latch or latch mechanism with a pop-up system of the present disclosure.
Figure 6:
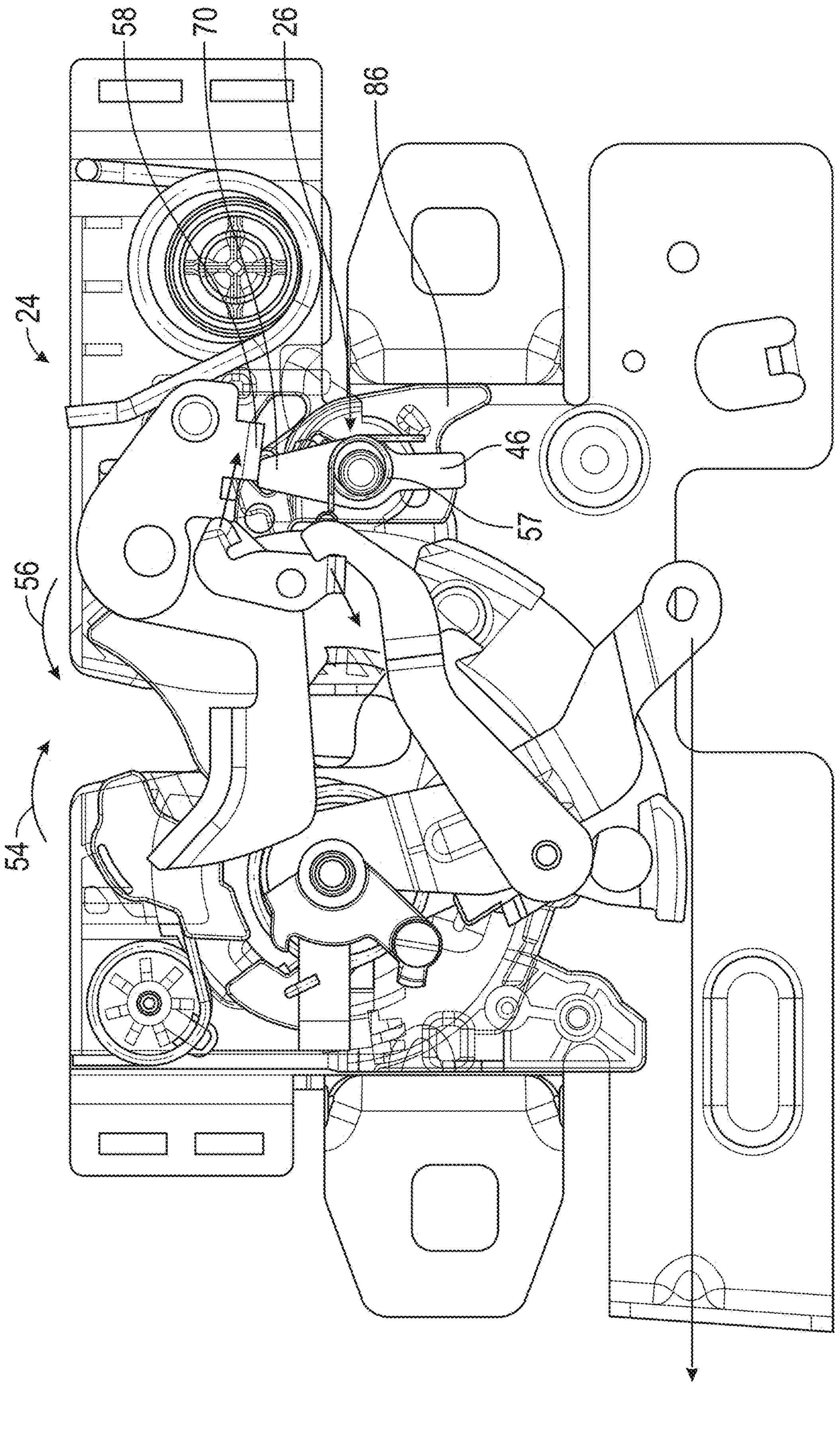
Figure 7:
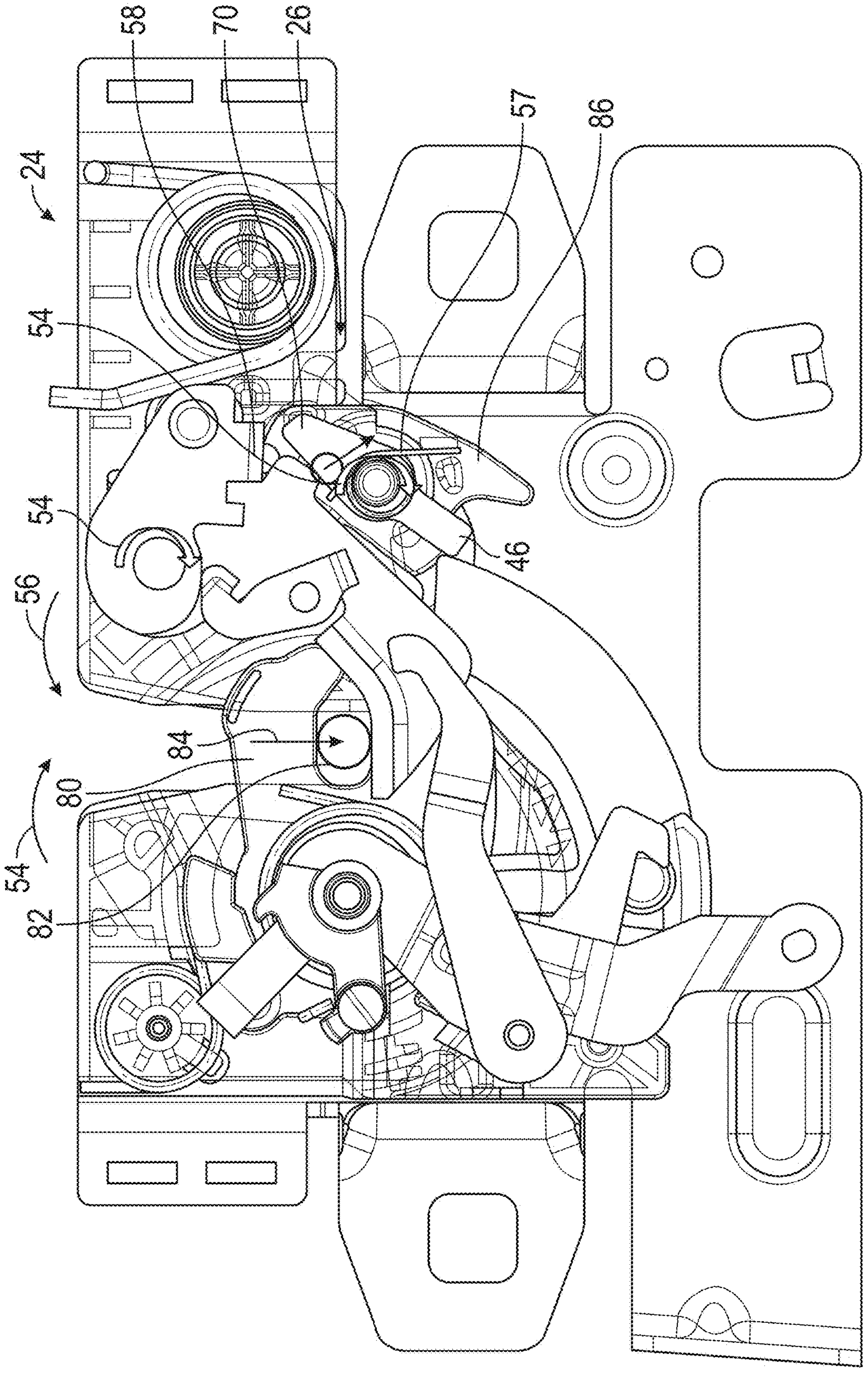
Figure 8:
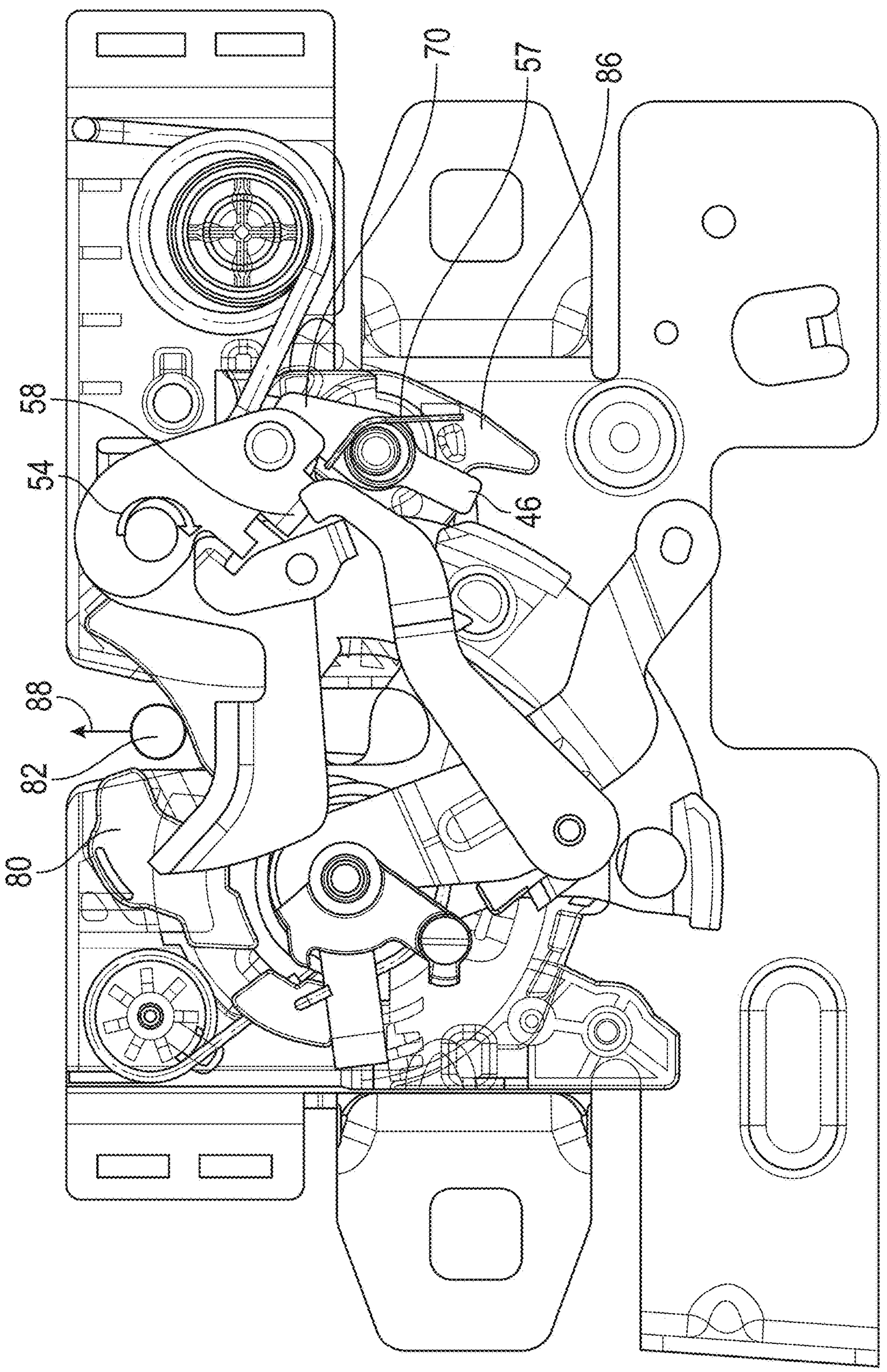

Referring now to FIGS. 5-8, the latch or latch mechanism 24 with the pop-up up system or mechanism 26 in accordance with the present disclosure is illustrated. In FIGS. 5-8, other components (e.g., claw, pawl etc.) of the latch or latch mechanism 24 are illustrated, as well as the striker of the hood 20. FIGS. 5-7, generally correspond to position of the pop-up up system or mechanism 26 illustrated in FIGS. 2-4

In FIG. 5, the latch or latch mechanism 24 is in an open position and a claw 80 of the latch or latch mechanism 24 has not yet engaged a striker 82 of the hood. The claw 80 being rotatably mounted to the plate 32. In FIG. 6, the cinch actuation of the latch or latch mechanism 24 has begun and the influence or biasing force of the main spring 28 is removed from the main lever 30 as previously discussed (e.g. first movement of movement of the cinch lever 42 in the direction of arrow 50 (FIG. 2 to FIG. 3), however, the main lever 30 and the claw 80 are still in their corresponding open positions. In FIG. 7, the striker 82 has been received in the claw 80 and the claw 80 has rotated in the direction of arrow 54 into a latch closed position (e.g., hood 20 is closed and the striker 82 is retained by the claw 80). This may be facilitated by the cinching operation (e.g., second movement of the cinch lever 42 in the direction of arrow 50 (FIG. 3 to FIG. 4) as mentioned with respect to FIG. 4. During this movement the striker 82 moves in the direction of arrow 84 until the claw 80 reaches its closed or primary position (illustrated in FIG. 7). As mentioned above, movement of the main lever 30 from the open position to the closed position either by gravity and/or rotation of the claw 80 from the open position to the closed or primary position causes pawl 46 to no longer be in an engaged position such that end 70 of the pawl 46 no longer contacts tab portion 58 of the split lever 36 as mentioned above.

In this position a latch pawl 86 retains the claw 80 in the closed or primary position until the latch pawl 86 is moved from an engaged position (retaining the claw 80 in the closed or primary position—FIG. 7) to a disengaged position (allowing the claw 80 to rotate from the closed or primary position to the open position in the direction of arrow 56—FIG. 6). Once this occurs, the claw 80 can move from the closed or primary position to the open position in the direction of arrow 56 while the main lever 30 provides a biasing or opening or pop-up force to the striker 82 in the direction of arrow 88 through release of the biasing force of the main spring 28 acting upon the split lever 36 which in turn moves the main lever 30 in the direction of arrow 54 via split lever 36. In one non-limiting embodiment, the latch pawl 86 is rotatably mounted to the plate 32 for movement between at least the engaged position and the disengaged position.

Accordingly, and in accordance with the present disclosure, the pop-up system or mechanism is provided with a latch or latch mechanism that allows removal of the influence of the pop-up spring prior to a closing action of the hood 20 via a cinching operation that transitions the claw 80 from the open position to a closed or primary position. Additionally, a retention mechanism is provided that includes a pawl 46 component that keeps the main spring 28 disabled (e.g., prevented from providing a biasing force to the main lever 30) until the latch or latch mechanism 24 is closed. This retention mechanism is then overridden or released when the latch or latch mechanism 24 reaches its fully closed position so that the main spring 28 can provide a pop-up or opening force when the latch 24 is released.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A pop-up system in combination with a latch mechanism of a vehicle hood of a vehicle, the combination comprising:

a main lever pivotally mounted to a plate of the latch mechanism;

a split lever pivotally mounted to the plate;

a main spring for providing a biasing force to the main lever via the split lever;

a bell crank pivotally mounted to the main lever, the bell crank being operably coupled to the split lever at one end and a link at another end, the link pivotally mounted to a cinch lever, the cinch lever being pivotally mounted to the plate; and a pawl pivotally mounted to the plate, the pawl being pivotable between at least an engaged position, in which the pawl maintains the split lever in a first position, such that a biasing force of the main spring is prevented from being applied to the main lever, and a disengaged position, in which the biasing force of the main spring is applied to the main lever in order pivot the main lever into an open position when the latch mechanism is released.

2. The combination according to claim 1, wherein the split lever has a pin or protrusion that is configured contact a leg of the main spring in order to apply the biasing force of the main spring to the main lever.

3. The combination according to claim 1, wherein the split lever has a tab portion configured to contact an end of the pawl when the pawl is in the engaged position.

4. The combination according to claim 3, wherein a rotational force is applied to the main lever by an edge of the tab portion of the split lever contacting an edge portion of the main lever in order to pivot the main lever into the open position.

5. The combination according to claim 1, wherein the bell crank has a tab portion configured to contact a tab portion of the split lever when the split lever is in the first position.

6. The combination according to claim 1, wherein the main lever has a tab portion configured to contact the pawl and rotate the pawl into the disengaged position.

7. The combination according to claim 1, wherein the latch mechanism further comprises: a claw rotatably mounted to the plate.

8. The combination according to claim 7, wherein the latch mechanism further comprises: a latch pawl rotatably mounted to the plate for rotation between an engaged position and a disengaged position, when in the engaged position, the latch pawl retains the claw in a closed position, and when in the disengaged position, the latch pawl allows the claw to rotate from the closed position to an open position, such that the latch mechanism is released.

9. The combination according to claim 8, wherein the split lever has a pin or protrusion that is configured contact a leg of the main spring, in order to apply the biasing force of the main spring to the main lever.

10. The combination according to claim 9, wherein the split lever has a tab portion configured to contact an end of the pawl when the pawl is in the engaged position.

11. The combination according to claim 10, wherein a rotational force is applied to the main lever by an edge of the tab portion of the split lever contacting an edge portion of the main lever, in order to pivot the main lever into the open position.

12. The combination according to claim 11, wherein the bell crank has a tab portion configured to contact a tab portion of the split lever when the split lever is in the first position.

13. The combination according to claim 12, wherein the main lever has a tab portion configured to contact the pawl and rotate the pawl into the disengaged position.

14. The combination according to claim 13, wherein the latch mechanism is configured to retain the vehicle hood in a closed position by engaging a striker of the vehicle hood.

15. The combination according to claim 1, wherein the latch mechanism is configured to retain the vehicle hood in a closed position by engaging a striker of the vehicle hood.

16. A method for disengaging a main spring from a main lever of a pop-up system for a latch mechanism of a vehicle, the method comprising:

pivotally mounting the main lever to a plate of the latch mechanism;

pivotally mounting a split lever to the plate;

providing a biasing force by a main spring to the main lever via the split lever;

pivotally mounting a bell crank to the main lever, the bell crank being operably coupled to the split lever at one end and a link at another end, the link pivotally mounted to a cinch lever, the cinch lever being pivotally mounted to the plate; and pivotally mounting a pawl to the plate, the pawl being pivotable between at least an engaged position, in which the pawl maintains the split lever in a first position, such that a biasing force of the main spring is prevented from being applied to the main lever, and a disengaged position, in which the biasing force of the main spring is applied to the main lever in order pivot the main lever into an open position when the latch mechanism is released.

* * * * *